(12) United States Patent
Feder et al.

(10) Patent No.: US 6,375,095 B1
(45) Date of Patent: Apr. 23, 2002

(54) SWIVELING, CONVERGING-DIVERGING, AXISYMMETRIC EXHAUST NOZZLE

(75) Inventors: Didier Georges Feder, Savigny le Temple; Guy Jean-Louis Lapergue, Rubelles; Bertrand Pierre Renaud Monville, Moissy Cramayel; Laurent Claude Patrick Salperwick, Lizines, all of (FR)

(73) Assignee: Societe Nationale d'Etude et de Construction de Moteurs d'Aviation S.N.E.C.M.A., Paris (FR)

( * ) Notice: Subject to any disclaimer, the term of this patent is extended or adjusted under 35 U.S.C. 154(b) by 0 days.

(21) Appl. No.: 09/549,539

(22) Filed: Apr. 14, 2000

(30) Foreign Application Priority Data

Apr. 15, 1999 (FR) .............................. 99 04709

(51) Int. Cl.[7] .............................................. B05B 12/00
(52) U.S. Cl. .................................................. 239/265.41
(58) Field of Search ........................ 239/265.41; 60/228

(56) References Cited

U.S. PATENT DOCUMENTS

| 4,984,741 A | 1/1991 | Nightingale |
| 5,150,839 A | 9/1992 | Reedy |
| 5,239,815 A | 8/1993 | Barcza |
| 5,511,376 A | 4/1996 | Barcza |
| 6,067,793 A | * 5/2000 | Urruela et al. ......... 239/365.41 |
| 6,199,772 B1 | * 3/2001 | Renggli ................. 239/365.41 |

FOREIGN PATENT DOCUMENTS

| EP | 0 060 763 A1 | 9/1982 |
| EP | 0 503 963 A1 | 9/1992 |
| EP | 0 557 229 A1 | 8/1993 |
| FR | 1025827 | 4/1953 |
| GB | 1306588 | 2/1973 |
| WO | WO 92/03649 | 3/1992 |

* cited by examiner

Primary Examiner—Charles G. Freay
(74) Attorney, Agent, or Firm—Bacon & Thomas, PLLC

(57) ABSTRACT

An axisymmetric, converging-diverging and swiveling exhaust nozzle includes converging flaps (3) driven by an axially displaceable drive ring (7). The diverging flaps (15) are connected by linkrods (20) to a pivoting ring (21). The pivoting ring (21) is mounted in swiveling manner on a spherical segment (30) fixedly joined to the structure (13). In an embodiment variation, the spherical segment (30) is mounted by a sliding connection on the stationary structure. A rotation-blocking system (33) precludes the rotation of the spherical segment (30) about the axis X of the turbojet engine.

5 Claims, 8 Drawing Sheets

SWIVELING, CONVERGING-DIVERGING, AXISYMMETRIC EXHAUST NOZZLE

BACKGROUND OF THE INVENTION

1. Field of the Invention

The invention relates to an axisymmetric, converging-diverging, axisymmetric turbojet-engine exhaust nozzle having a swiveling diverging component.

2. Description of the Related Art

More specifically the invention relates to a converging-diverging, axisymmetric turbojet-engine exhaust nozzle which, downstream of an exhaust duct having an axis X, there is provided a first ring of converging flaps hinged on the downstream end of the exhaust duct and driven by first control means, and, downstream of the first ring of flaps, a second ring of diverging flaps is provided, the upstream ends of which are hinged on the downstream ends of the corresponding converging flaps and further, wherein the downstream ends of the second ring of flaps are linked by linkrods to a pivoting ring cooperating with a spherical segment of a fixed structure, said pivoting ring being driven by a second control means to deflect the jet of exhaust gases.

These axisymmetric swiveling nozzles impart additional agility to combat aircraft, and improved manoeuverability in pitch and yaw.

U. S.Pat. Nos. 5,150,839 and 5,511,376 disclose nozzles within which spherical walls are fixed relative to the exhaust duct.

In U.S. Pat. No. 5,150,839 a pivoting ring is situated inside a spherical wall and is kept against the inside of the spherical wall by the pressure which the jet of exhaust gases exerts on the diverging flaps.

In U.S. Pat. No. 5,511,376 a pivoting ring encloses a spherical segment and comprises an inner cylindrical surface allowing axial ring translation or its pivoting motion when driven by linear actuators.

BRIEF SUMMARY OF THE INVENTION

The nozzle of the present invention may be characterized in that the pivoting ring swivels on the outer wall of a spherical segment to center said ring relative to the said spherical segment.

The invention furthermore comprises a rotation-blocking system preventing the ring from rotating around the nozzle control axis X. Advantageously this rotation-blocking system comprises at least one roller having a radial axis and borne on the pivoting ring such that it cooperates with the side walls of an aperture in the spherical segment and also such that it has an axis of symmetry corresponding with the axis X.

In order to allow varying of the exhaust cross-section of the ring of diverging flaps, the spherical segment advantageously is mounted on a fixed structure so as to be able to slide parallel to the axis X due to an axial displacement of the pivoting ring itself driven by the second control means. Preferably, the spherical segment is supported on a plurality of brackets affixed to the fixed structure and running parallel to the axis X. The spherical segment encloses said brackets and comprises a plurality of guide rollers cooperating with apertures in the brackets.

DESCRIPTION OF THE DRAWINGS

Further advantages and features of the invention are elucidated in the illustrative description below and in relation to the attached drawings.

DETAILED DESCRIPTION OF THE PREFERRED EMBODIMENT

Figure 1:
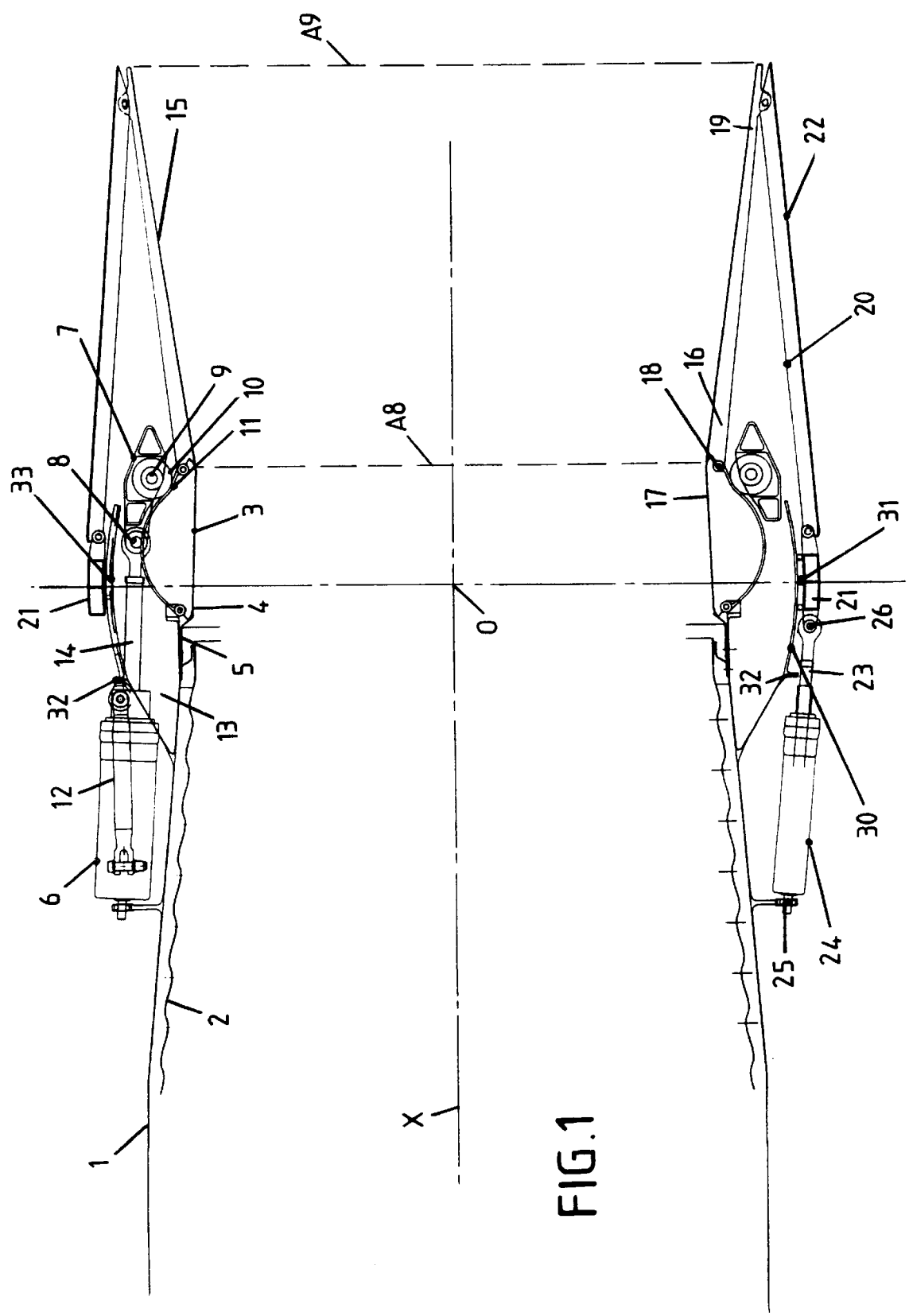
FIG. 1 is a section of the rear segment of a turbojet engine in a plane containing the turbine's axis of rotation, said rear segment being fitted with an axisymmetric, converging-diverging, swiveling nozzle of the invention.

These drawings show an after-burner duct 1 of a turbojet engine of which the axis X coincides with the turbine's axis of rotation. The afterburner duct 1 is annular, encloses a thermal protection sleeve 2, and constitutes part of the stationary or fixed structure of the rear turbojet-engine.

A first ring of converging flaps 3 consisting of a plurality of driven converging flaps and of a plurality of follower converging flaps alternating with the driven converging flaps is situated in the extension of the afterburner duct 1. The converging flaps 3 hinge at their upstream ends 4 on the downstream end 5 of the afterburner duct 1. The exhaust cross-section A8 of the ring of converging flaps 3 is regulated by a system of linear actuators 6 which are anchored upstream on the outer side of the afterburner duct 1 and which are linked by a swivel 8 to a drive ring 7. Rollers 10 are affixed by shafts 9 to the drive ring 7 and respectively press against cams 11 fitted on the outer surfaces of the driven converging flaps 3. Linkrods 12 situated between the cylinders of the linear actuators 6 and a stationary structure 13 enclosing the downstream end 5 of the afterburner duct 1 react part of the thrust exerted by the rods 14 of the linear actuators 6.

Extension and retraction of the rods 14 of the linear actuators 6 entail translation of the drive ring 7 parallel to the axis X and a change in the cross-section A8.

A second ring of diverging flaps 15 is situated downstream of the cross-section A8. This second ring of flaps comprises a plurality of driven diverging flaps 20 in the extension of the driven converging flaps and a plurality of follower diverging flaps alternating with the driven diverging flaps. Each diverging flap 15 hinges, at its upstream end 16, on the downstream end 17 of the corresponding converging flap 3 so as to be pivotable about a shaft 18, and, at its downstream end 19, on the downstream end of a linkrod 20 in turn connected to a pivoting ring 21 enclosing the stationary structure 13. The linkrods 20 may be integrated into cold flaps 22 constituting the nozzle's aerodynamic outer contour.

The pivoting ring 21 is connected by swivels 25 to the rods 23 of a plurality of linear actuators 24 anchored upstream in the outer surface of the afterburner duct 1. The connections 26 between the rods 23 of the linear actuators 24 and the pivoting ring also are swivels or pivots.

The stationary structure 13 is rigidly joined to the afterburner duct 1 and carries an annular spherical segment 30 with axis X and enclosing the converging flaps 3 and the drive ring 9, this pivoting ring 21 being mounted in swiveling manner on said spherical segment 30 by an appropriate rolling or sliding system 31, for instance ball-fitted skids, to reliably center the pivoting ring 21 relative to the center of rotation O of the spherical segment 30.

Figure 2:
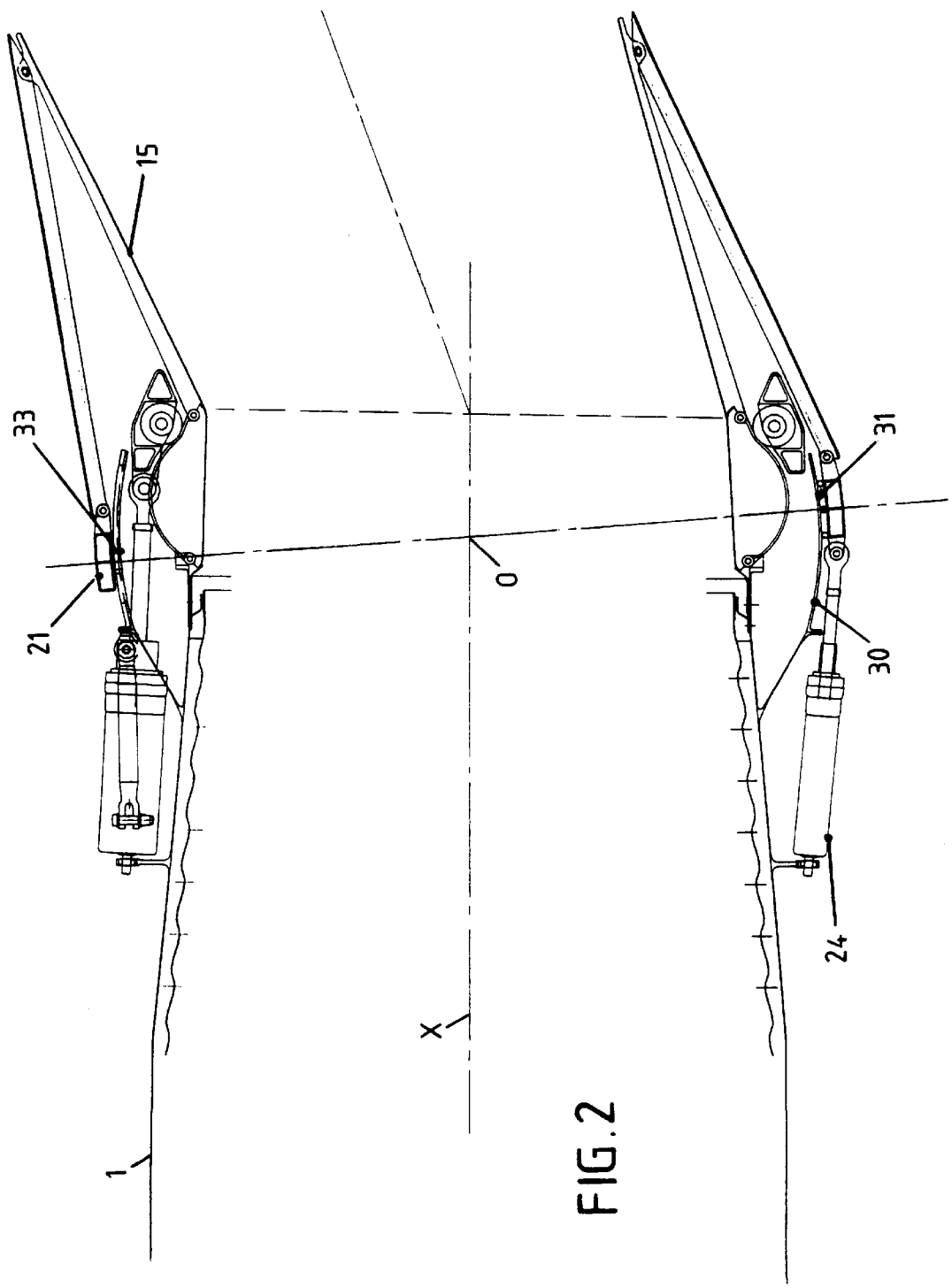
FIG. 2 is similar to FIG. 1 and shows the nozzle in the open, upward position.
Figure 3:
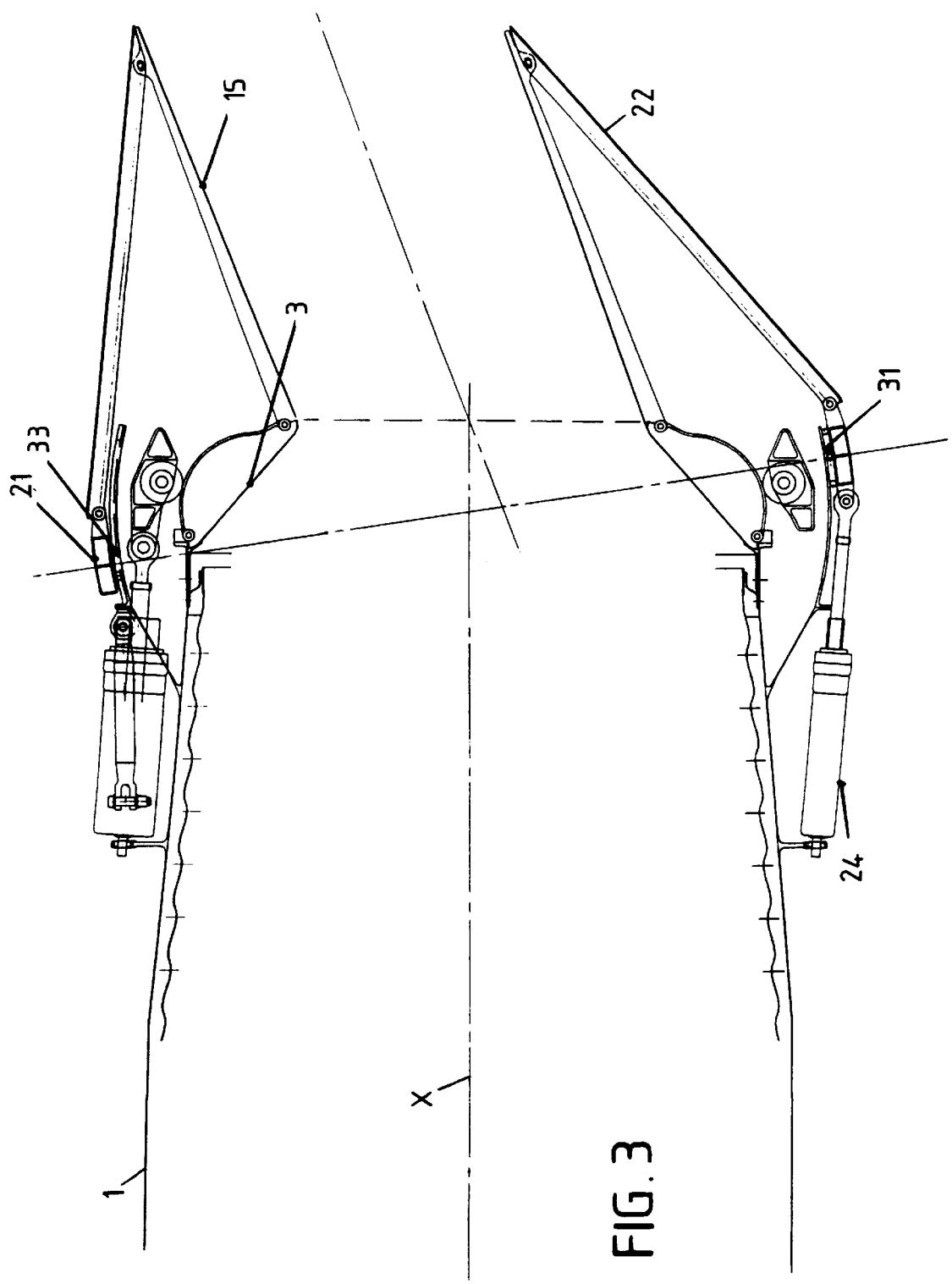
FIG. 3 is similar to FIG. 1 and shows the nozzle in the closed, upward position.

In a first embodiment of the invention shown in FIGS. 1 through 3, the spherical segment 30 is affixed to a collar 32 of the stationary structure 13.

Figure 6:
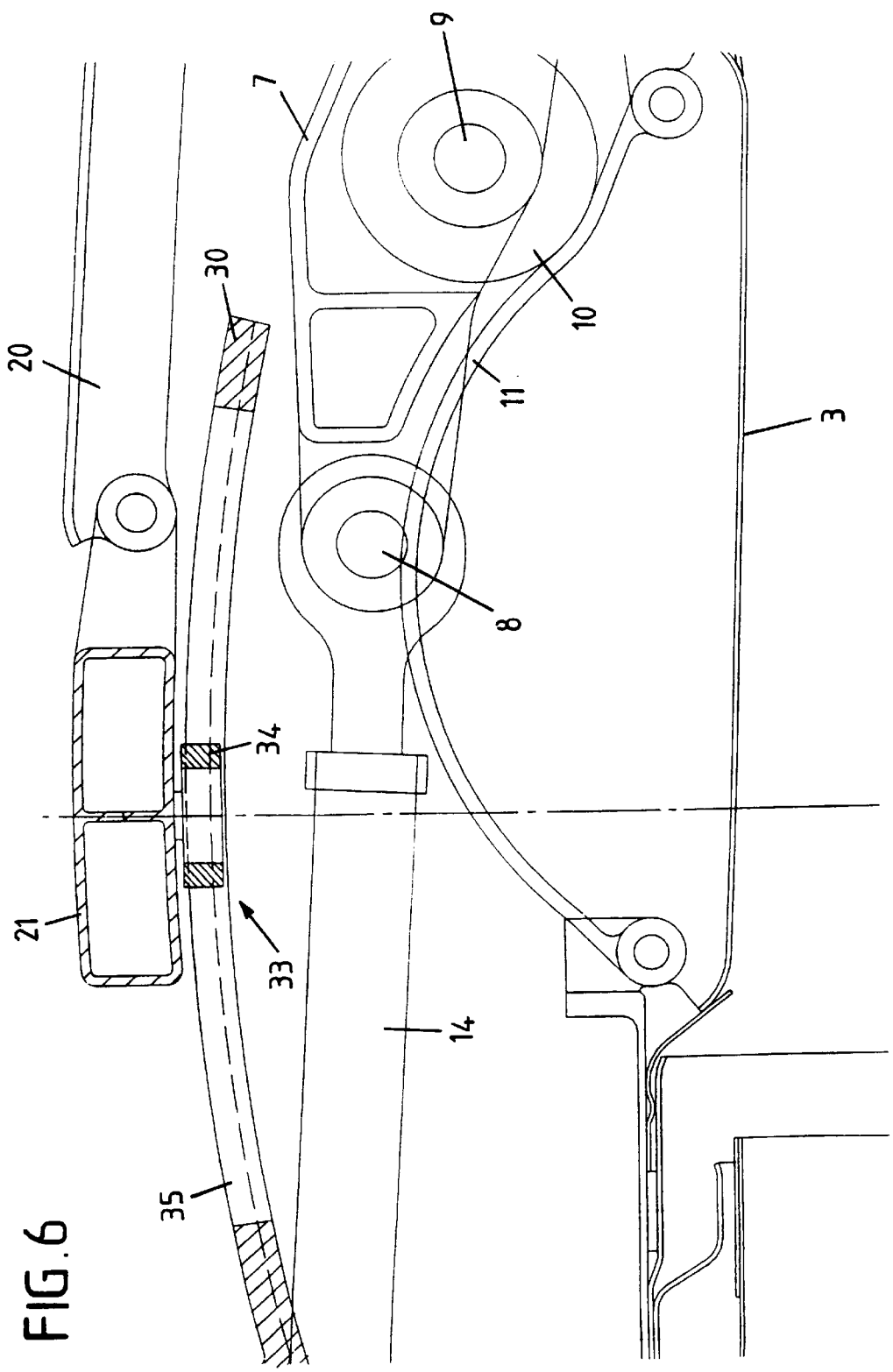
FIG. 6 is a section in a plane containing the turbine axis of the nozzle of FIGS. 1 through 3 and showing on a larger scale the rotation-blocking system of the pivoting ring.
Figure 7:
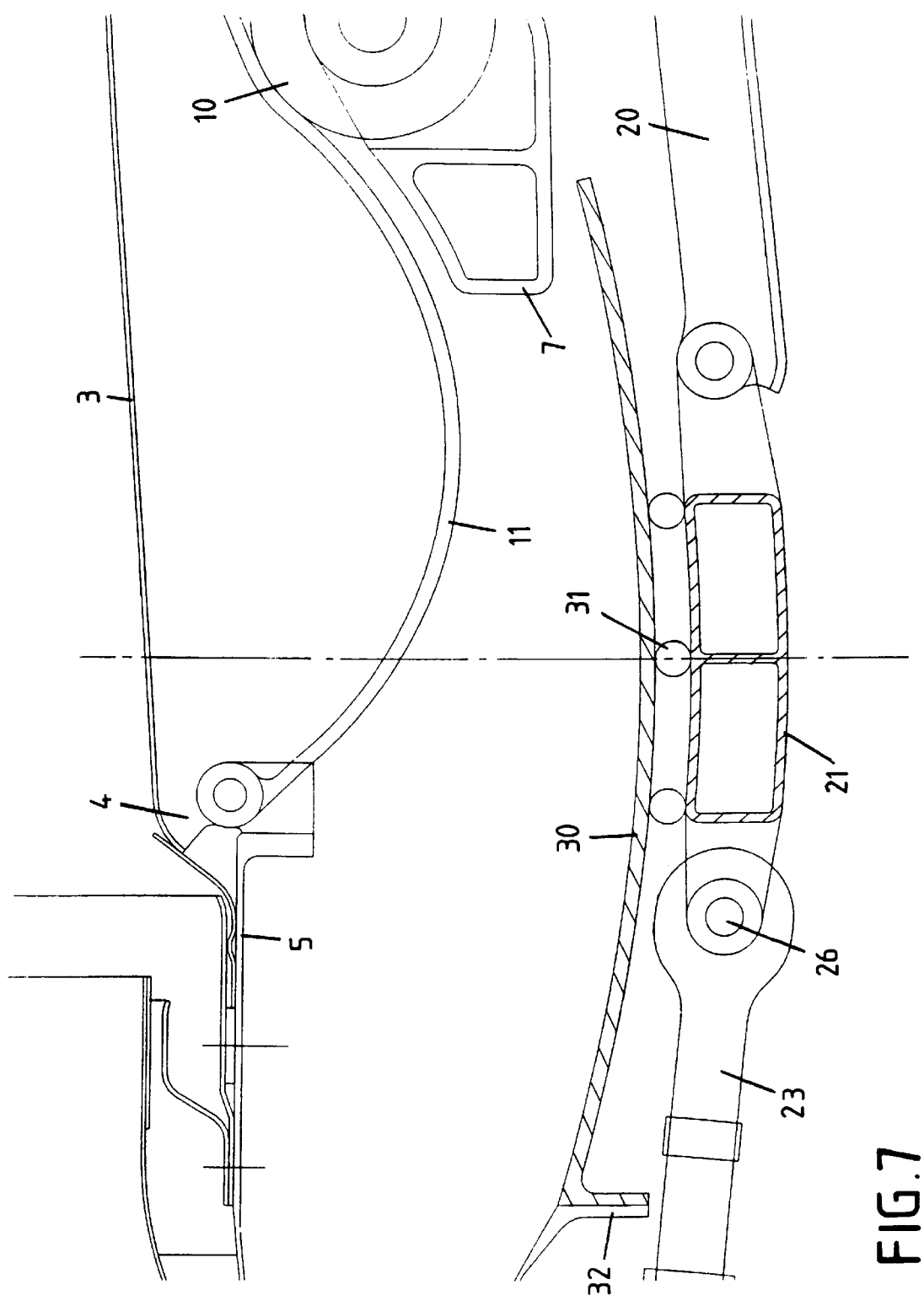
FIG. 7 is a section in a plane containing the turbine axis of the nozzle of FIGS. 1 through 3, and, on an enlarged scale, the system centering and rolling the pivoting ring on the spherical segment.

To prevent the pivoting ring 21 from rotating around the axis X, a rotation-blocking system 33 is provided which is compatible with sliding motions, in pitch and yaw, of the pivoting ring 21 around the spherical segment 30. For that purpose and as shown in FIG. 6, the pivoting ring 21 comprises at least one roller 34, having a radial axis and sliding in an aperture 35 in the wall of the spherical segment 30 and symmetrical relative to a plane containing the axis X. Preferably the pivoting ring 21 comprises two diametrically opposite rollers 34.

The linear actuators 24 driving the pivoting ring 21 in rotation about the origin O of the spherical segment 30 are configured in such a way as to allow moving the pivoting ring on the spherical segment 30. There may be two linear actuators 24 offset by 90° from each other around the axis X. A displacement, identical or different, of the two linear actuators will move the pivoting ring 21 about the center O because the ring 21 is swiveling on the spherical segment 30. The rotation-blocking system 33 furthermore prevents the pivoting ring from rotating about the axis X.

Moving the pivot ring 21 entails a deflection of the jet of exhaust gases and a change in the exhaust cross-section A9 of the diverging nozzle.

The combination of axial displacement of the control ring 7 and moving of the pivoting ring 21 allows modifying the configuration of the converging-diverging nozzle. FIG. 1 shows accordingly the above described nozzle in the open and unswiveled configuration, FIG. 2 shows this nozzle in the swiveled open configuration and FIG. 3 shows it in the swiveled closed configuration.

Figure 4:
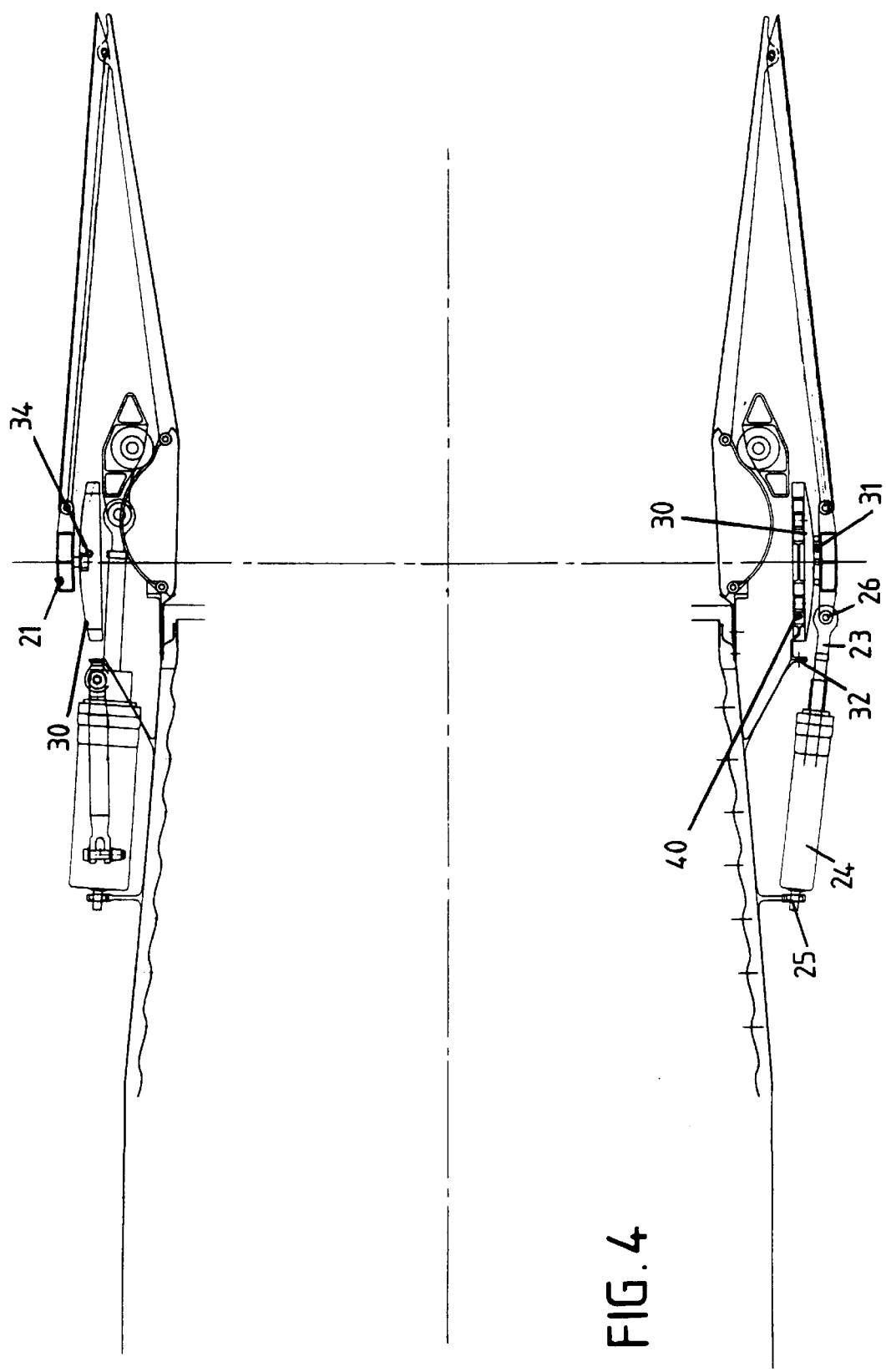
FIG. 4 is a section in a plane, containing the turbine's axis of rotation, of an embodiment variation of the swiveling, converging-diverging, axisymmetric nozzle of the invention.
Figure 5:
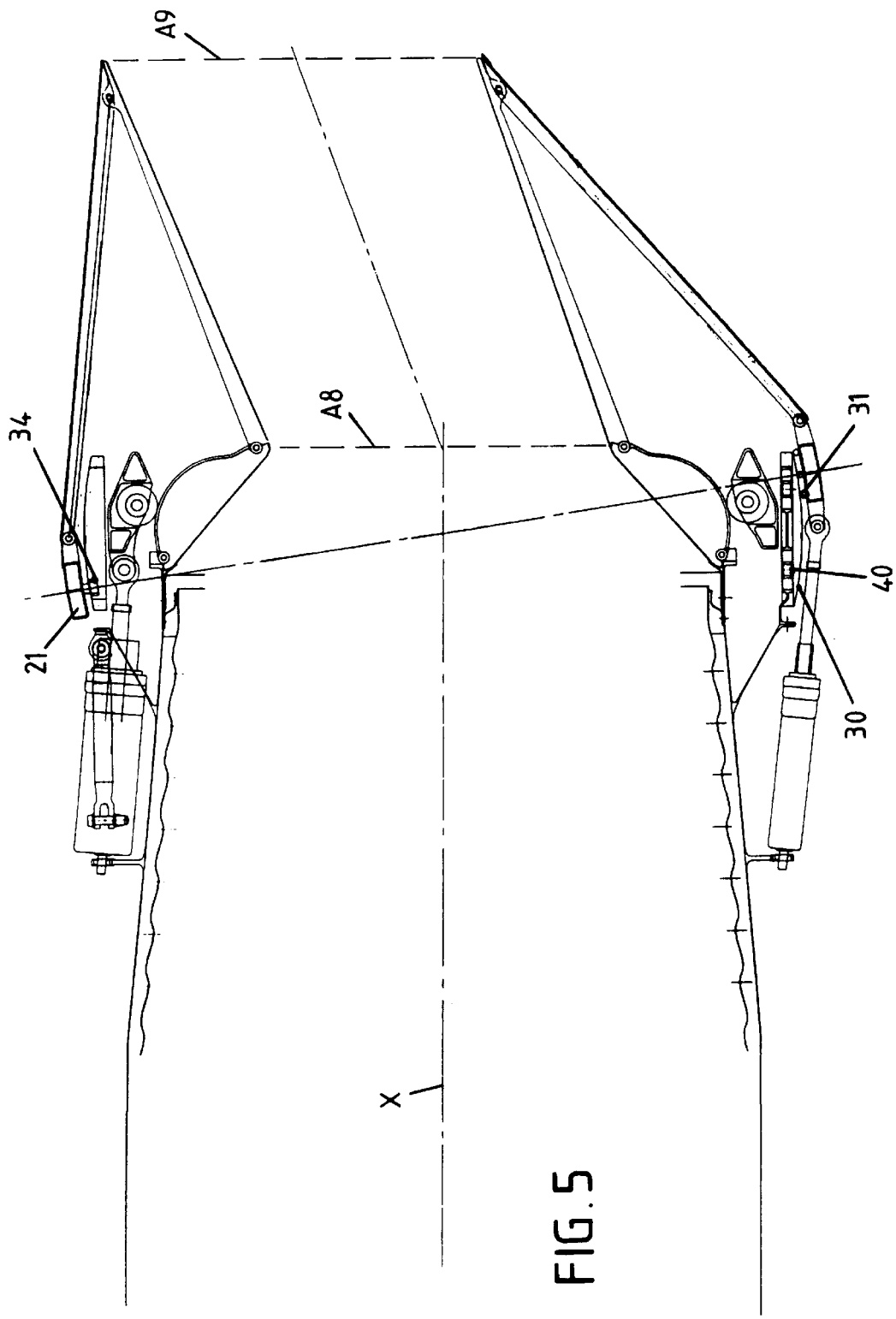
FIG. 5 is similar to FIG. 4 and shows the nozzle in the closed, upward position.
Figure 8:
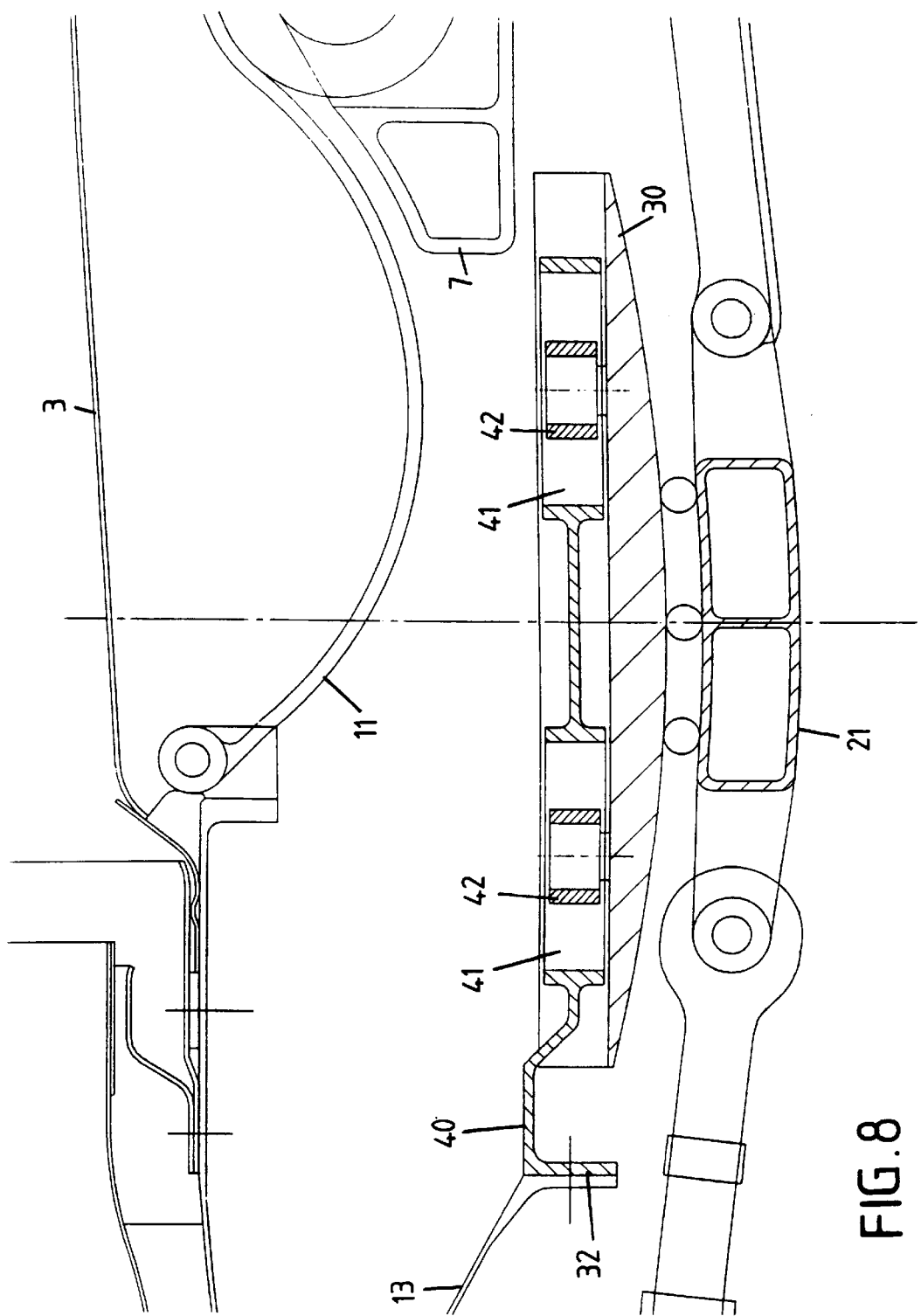
FIG. 8 is a section in a plane containing the turbine axis of the nozzle of FIGS. 4 and 5 and, on an enlarged scale, the sliding coupling of the spherical segment to a guide bracket.

In an embodiment variation of the invention shown in FIGS. 4, 5 and 8, the spherical segment 30 is supported in such manner on the stationary structure 13 that it can slide relative to it parallel to the axis X due to the pivoting ring 21 moving axially when driven in the same direction by the rods 23 of the linear control actuators 24. In this variation, there are at least three linear control actuators 24 angular equidistant by 120° around the axis X.

The stationary structure 13 comprises an appropriate number of brackets 40 running parallel to the axis X and affixed upstream to the collar 32 and spread around the axis X. Each bracket 40 comprises one or more apertures 41 in planes parallel to or containing the axis X and wherein rollers 42 may slide while attached to the spherical segment 30. FIG. 8 shows an embodiment of sliding connections between the spherical segment 30 and a support bracket 40.

This particular design to some extent allows varying the diverging-nozzle cross-section A9 given a particular cross-section A8, regardless of swivel position.

The system 33 of the spherical segment 30 blocking rotation about the axis X, and shown in FIG. 6, also can be mounted on the spherical segment 30 shown sliding on the brackets 40.

Modifications apparent to those skilled in the art may be made while not departing from the spirit and scope of the claims that follow.

What is claimed is:

1. An axisymmetric, converging-diverging exhaust nozzle of a turbojet engine, said nozzle comprising at its downstream side an exhaust duct (1) having an axis X, a first ring of converging flaps (3) which hinge on the downstream end of the exhaust duct (1) and which are driven by first control means (6, 7, 14) and, downstream of the first ring of flaps, a second ring of diverging flaps (15) the upstream ends (16) of which hinge on the downstream ends (17) of the corresponding converging flaps (3) and the downstream ends (19) of which are connected by linkrods (20) to a pivoting ring (21) cooperating with a spherical segment (30) affixed to a stationary structure (13), said pivoting ring (21) being driven by a second control means (24) so as to allow deflection of the jet of exhaust gases, said pivoting ring (21) being mounted in a swiveling manner on an outer wall of the spherical segment (30) to reliably center said ring around said spherical segment, said spherical structure connecting to said stationary structure by a plurality of brackets (40) secured to one end of said stationary structure and extending parallel to the axis X, said plurality of brackets slidably engaging said spherical structure such that said spherical structure slides parallel to the axis X upon an axial displacement of the pivoting ring when driven by the second control means and constraining movement of said spherical structure along only the X axis.

2. The nozzle as claimed in claim 1, comprising a rotation-blocking system (33) arranged so as to prevent the pivoting ring (21) from rotating about the axis X.

3. The nozzle as claimed in claim 2, wherein the rotation-blocking system (33) comprises at least one roller (34) having a radial axis and supported by the pivoting ring (21) and further cooperating with the sidewalls of an aperture (35) provided in the spherical segment (30) and having a radial plane of symmetry including the axis X.

4. The nozzle as claimed in claim 1, wherein the spherical segment (30) encloses the brackets (40) and comprises a plurality of guide rollers (42) cooperating with apertures (41) in the brackets (40).

5. The nozzle as claimed in claim 1, wherein the first control means comprises a drive ring (7) having as its axis of rotation the axis X and situated inside the spherical segment (30) and fitted with a plurality of rollers (10) pressing against cams (11) respectively connected to the converging flaps (3).

* * * * *

UNITED STATES PATENT AND TRADEMARK OFFICE
CERTIFICATE OF CORRECTION

PATENT NO. : 6,375,095 B1
DATED : April 23, 2002
INVENTOR(S) : Feder et al.

It is certified that error appears in the above-identified patent and that said Letters Patent is hereby corrected as shown below:

Column 2,
Line 57, delete "20".

Signed and Sealed this

Twelfth Day of November, 2002

Attest:

Attesting Officer

JAMES E. ROGAN
Director of the United States Patent and Trademark Office